UNITED STATES PATENT OFFICE 2,366,641

UNSATURATED DERIVATIVES OF KETONIC COMPOUNDS

Maurice L. Moore, Detroit, Mich., assignor to Sharp & Dohme Incorporated, Philadelphia, Pa., a corporation of Maryland No Drawing. Original application August 8, 1941, Serial No. 405,936. Divided and this application August 19, 1944, Serial No. 550,311

11 Claims. (Cl. 260—239.6)

This invention relates to carboxyacyl-aminoarylsulfonamidothiazolones, in which the carboxyacyl group is the radical remaining when the hydroxyl group is removed from only one of the two or more carboxyl groups of an unsaturated aliphatic polycarboxylic acid, and the invention covers such products containing the remaining carboxyl group or groups unaltered as well as with the hydrogen in any of such remaining carboxyl groups replaced by a carboxylate-forming element or radical.

The invention of these products comprises the usefulness of this type of product as intestinal antiseptics for combatting and reducing the concentration of organisms causing intestinal infection.

The products of this invention may be represented by the general formula

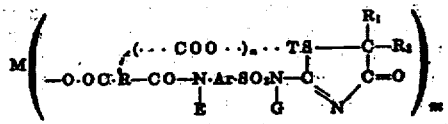

in which M may be hydrogen as well as any other radical capable of combining with a carboxyl radical to form a carboxylate, such as the metals as the alkali metals sodium, potassium, lithium and the like, the alkaline earths as calcium, magnesium, barium and the like, antimony, copper, gold, iron, bismuth and manganese and the like, an alkyl radical, a nitrogen base as ammonium and corresponding radicals of alkyl amines and alkanolamines and the like; and R is the residue of an unsaturated aliphatic polycarboxylic acid, stripped of its carboxyl groups; and T may be hydrogen as well as any of the radicals represented by M and when M is polyvalent T may represent some or all of the valences of M not satisfied by the single carboxyl group to which M is illustrated as being attached; and $n$ may be zero as well as any whole number up to four, whereby the grouping $$\cdots(\cdots COO\cdots)_n\cdots T$$

represents the carboxyl and the carboxylate groups over two from any polycarboxylic acid having more than two carboxyl groups, and $m$ is a small number equal to the valence of M when $n$ is zero and also when each occurrence of radical T is either hydrogen or any other monovalent radical and also when each occurrence of the radical T (whether mono- or poly-valent) is different from the radical M; and since M and T may be separately polyvalent, $m$ may be one when all of the carboxyl groups in the carboxylacyl radical satisfy all of the valences of such polyvalent radicals M and T; and E may be hydrogen as well as an alkyl radical having, for example, from one to about eight or more carbon atoms as well as an aryl radical such as phenyl (unsubstituted as well as substituted); and Ar is an aryl radical (having, as shown in the general formula, a valence linked to nitrogen and a valence linked to sulfur) such as the phenyl (unsubstituted as well as substituted, for example, having nitro, amino, alkyl, carboxyl, sulfonic acid, hydroxy, alkoxy with the alkyl saturated or unsaturated and straight or branched chain, phenyl, halogen such as chlorine, and the like substituents) and naphthyl (similarly unsubstituted as well as substituted) radicals; and G may be hydrogen as well as an alkyl radical, saturated or unsaturated, for example, methyl, ethyl, propyl, butyl, amyl, allyl, hexyl, heptyl, octyl and the like, or decyl, dodecyl, hexadecyl and the like and cyclopentenyl or cyclohexyl, as well as an aralkyl radical as benzyl and the like, as well as an aryl radical as phenyl (unsubstituted as well as substituted as noted for Ar above), naphthyl (similarly unsubstituted as well as substituted) and the like; and $R_1$ and $R_2$ may be separately hydrogen as well as a radical such as an alkyl (straight or branched chain or cyclic) radical, saturated or unsaturated, for example, methyl, ethyl, propyl, butyl, amyl, allyl, hexyl, heptyl, octyl and the like, or decyl, dodecyl, hexadecyl and the like, or cyclopentenyl or cyclohexanyl and the like, as well as an aryl radical as phenyl (substituted as well as unsubstituted as noted for Ar above), tolyl, diphenyl, naphthyl (all similarly unsubstituted as well as substituted), as well as an aralkyl radical as benzyl and the like, or a nitrogen containing radical as nitro and amino (unsubstituted and substituted as acyl- and alkyl-) and an oxygenated radical, for example, hydroxy, alkoxy such as methoxy, ethoxy, propoxy, and carbalkoxy such as carbmethoxy, carboxyl, and halo-alkyl as chlorethyl and the like, and halogen, for example, chlorine and bromine.

The carboxyacyl group (remaining group when the hydroxy group is removed from only one of the at least two carboxyl groups of the polycarboxylic acid) may be derived from any desirable unsaturated aliphatic polycarboxylic acid, for example, those having at least four carbon atoms and further particularized by maleic and citraconic (methylmaleic) acids and their respective isomers, fumaric and mesaconic (methylfumaric) acids.

Other unsaturated aliphatic polycarboxylic acids from which the carboxyacyl radical may be derived are the tribasic unsaturated acids exemplified by aconitic acid and derivatives thereof as those in which any of the methylene or chain hydrogens is replaced by any desirable substituent.

The invention also includes the preparation of these carboxyacylaminoarylsulfonamidothiazolones which are made by heating the desired polycarboxylic acid, its anhydride, or an ester, such as an alkyl ester, or a monohalide, such as the monochloride or a monochloride of the ester, thereof with, for example, the desired aminobenzenesulfonamidothiazolone, either merely together or in an inert reaction medium such as an inert solvent, and as in the latter case separating the desired end product or, as in the case of the use of the ester, liberating the end product by hydrolysis, and in any case, where necessary, subjecting it to purification as by recrystallization. With the unsaturated aliphatic acids having four and five carbon atoms in the chain, the desired anhydride is taken as the starting material, while with the acids having over five carbon atoms in the chain, the free acid may be heated directly with the selected aminoarylsulfonamidothiazolone. If desired, the monohalide of the ester of any acids may be used as the starting material.

The invention may be illustrated by, but not restricted to, the following example:

*Example—2-N⁴-maleylsulfanilamido-5-ethyl-4-thiazolone.*—0.9 gram of maleyl anhydride was added to a boiling suspension of 2 grams of 2-sulfanilyl-5-ethyl-4-thiazolone in 50 cc. of alcohol and the boiling was continued for about five minutes when the solution was complete. The reaction solution was then diluted and chilled. The desired 2-N⁴-maleylsulfanilamido-5-ethyl-4-thiazolone after filtering, upon recrystallization from dilute alcohol, melted with decomposition at 160-165° C.

By replacing the maleic anhydride in the above example by the equivalent quantity of the possible inner anhydrides of other acid derivatives, such as citraconic acid anhydride and the like, corresponding carboxyacylsulfanilylthiazolones are obtained, for example, 2 - N⁴ - citraconylsulfanilamido-5,5-diethyl-4-thiazolone, 2-N⁴-citraconylsulfanilamido-5-ethyl-4-thiazolone.

The carboxyacylaminoarylsulfonamidothiazolones derived from the transform derivatives may be obtained by the reaction of the desired sulfanilamidothiazolones with an equivalent quantity of a corresponding monochloride-ester of such derivative, with little or no heating, for example, with the equal quantity of the monochloride of the ethyl ester of, for example, fumaric or mesaconic acid, among which compounds of the invention are:

2-N⁴-fumarylsulfanilamido-4-thiazolone,
2-N⁴-fumarylsulfanilamido-5-ethyl-4-thiazolone,
2-N⁴-fumarylsulfanilamido-5,5-diethyl-4- thiazolone,
2-N⁴-mesaconylsulfanilamido-4-thiazolone,
2-N⁴-mesaconylsulfanilamido-5-ethyl- 4 - thiazolone, and
2 - N⁴ - mesaconylsulfanilamido - 5,5 - diethyl - 4 - thiazolone.

The carboxyacylaminoarylsulfonamidothiazolones in which the carboxyacyl radical is derived from an aliphatic polycarboxylic acid having more than five carbon atoms in the chain, are obtained, for example, by mixing equimolecular quantities of the desired sulfanilamidothiazolone and the desired polycarboxylic acid and heating the mixture at between about 135-155° C. for about an hour and then treating the reaction product in about one or one and one-half liters per mole of acid used of an about 10% solution of ammonium hydroxide to separate the insoluble, undesired by-products. The latter are then filtered off and the filtrate is neutralized with dilute hydrochloric acid yielding the desired carboxyacylaminoarylsulfonamidothiazolone which may, if desired, be purified by redissolving in dilute ammonia and slowly precipitating with dilute hydrochloric acid. Such compounds and those obtainable from the amino- and hydroxy-substituted derivatives of the acid are illustrated by:

2-N⁴-aconitylsulfanilamido-4-thiazolone,
2-N⁴-aconitylsulfanilamido-5-ethyl-4- thiazolone, and
2-N⁴-aconitylsulfanilamido-5,5-diethyl-4- thiazolone.

Furthermore, by replacing the 2-sulfanilamido-5-ethyl-4-thiazolone in any of the examples and in any of the modifications of the examples as just hereinabove and hereinbelow included in the various paragraphs following the example, by 2-sulfanilamido-4-thiazolone or by any thiazolone nuclearly (in the 5-position) substituted aminophenylsulfonamido-4-thiazolone having any of the substituents of the type represented by $R_1$ and $R_2$ in the general formula of the products of this invention, there are obtained the corresponding carboxyacylsulfanilamido- 4 -thiazolone and carboxyacylsulfanilamido - 4 - thiazolones in which there are one or two substituents in the 5-position on the thiazolone-nucleus. Thus, by varying the aminoarylsulfonamido-4-thiazolone or the sulfanilamido-4-thiazolone starting material and employing corresponding materials in which the thiazolone-nucleus is either non-substituted or substituted as just above indicated, there are obtained the corresponding compounds.

To obtain the compounds of the invention in which G of the general formula is a positive radical of the type hereinabove disclosed for G, the aminoarylsulonamidothiazolone starting material employed to produce the thiazole or thiazolone-nuclearly substituted compounds of the invention as shown above is alkylated or aralkylated or arylated by reaction with the necessary suitable alkylating, aralkylating or arylating agent to attach to the sulfonamido nitrogen the desired positive radical. Alkylating agents such as an alkyl halide, as methyl chloride or ethyl chloride or bromide, or an alkyl sulfate as an alkyl sulfonate, and the like, may be employed to replace the hydrogen represented by G by the desired alkyl radical, and by using the corresponding aralkylating or arylating agent, by the desired aralkyl or aryl radical. By reacting the thus obtained aminobenzenesulfonalkyl-, aralkyl-, or aryl-amido-4-thiazolone with the desired polycarboxylic acid, or anhydride or ester thereof, there is obtained any desired product of the invention having a positive radical other than hydrogen for the element G in the general formula, for example, the 2-N⁴-carboxyacylaminobenzenesulfonalkylamidothiazolones.

By replacing the carboxyacyl group in any of the above compounds including also the thiazolone-nuclearly substituted, as well as the N¹-substituted compounds of the invention, by the carboxyacyl radical derived from any other polycarboxylic acid of the type hereinabove disclosed, by employing any suitable one of the above described procedures, the corresponding compound of the invention with the corresponding different carboxyacyl radical is obtained. Also, by replacing the 2-(aminobenzenesulfonamido)-4-thiazolone or nuclearly-substituted thiazolone as a reactant in any of these procedures, there is obtained the corresponding carboxyacylaminoarylsulfonamido-4-thiazolone containing any desired carboxyacyl radical of the type herein indicated as well as any N¹-substituent or any one or two desired substituents in the 5-position on the thiazolone-nucleus.

From the various exemplifications of the compounds of the invention, there is seen that they may be generally referred to as carboxyacylaminoarylsulfonyl derivatives of aminothiazolones, in which the thiazolone portion, as indicated by the thiazolone nucleus and the elements $R_1$ and $R_2$ in the general formula, is referred to generally as "thiazolones" to embrace not only those compounds in which the thiazolone radical is derived from 4-thiazolone itself, but also those in which the thiazolone portion is derived from the 4-thiazolone nucleus mono- or di-substituted in the 5-position, and in which derivatives, the amino radical through which the thiazolone portion is attached to the sulfur, is either unsubstituted or substituted by a positive radical.

The products of the invention, in which M and T of the general formula are hydrogen are generally practicably water soluble, are usually neutral compounds, which become very substantially soluble in water when the free carboxyl group or groups in the product is converted to the carboxylate form by the use of the equivalent amount of ammonium hydroxide or an amine or alkanolamine or of sodium bicarbonate. Thus, the compounds in which M and T are hydrogen may exhibit a solubility in water within about five or up to about ten per cent, whereas the carboxylate form of the same compound may have a solubility up to about fifty per cent and even higher.

The carboxylate form of any of the compounds of the invention may be prepared, for example, by adding to a small amount of water an excess of the compound over its solubility in water and dissolving the excess by stirring in a sufficient quantity of, for example, anhydrous sodium bicarbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salt, preferably in aqueous solution, with a suitable soluble salt of the metal, the carboxylate salt of which is desired. The desired carboxylate salt is obtained by resulting double decomposition.

These compounds, applicable as intestinal antiseptics, exhibit such activity by the attachment to the various nuclear portions of the compound, of substituents the introduction of which into the basic nuclei leaves the compound substantially non-toxic. Similarly, the metallic element in the compounds used as intestinal antiseptics are such that their inclusion in the compound introduces no toxic characteristic.

In general, the carboxyacylsulfanilyl derivatives of the aminothiazolones, in which the carboxyacyl radical contains four carbon atoms in the aliphatic chain, are especially effective as such intestinal antiseptics for it is possible to build up a high concentration of them in the intestinal tract and without a simultaneously high blood level and yet with substantially no noticeable indication of toxic symptoms. Among these particularly effective compounds are such as those in which the carboxyacyl radical is obtained from maleic, citraconic, fumaric and mesaconic acids and their substituted derivatives. The $N^4$-carboxyacyl products of the invention show distinctive activity.

The various compounds, used as intestinal antiseptics, are administered orally, either in the form of tablets, capsules or powders of the solid material or as solutions of any desired concentration, exceeding, if desired, 50%.

In the specification and claims the carboxyacyl radical, as hereinabove defined, derived from specific polycarboxylic acids herein named, is designated by replacing the terminal "-ic" in the name of the acid by the ending "-yl" as, for example, maleyl, fumaryl and mesaconyl carboxyacyl radicals and the like, derived respectively from maleic, fumaric and mesaconic acids and the like.

The term "benzene" as used in the specification and claims, for example, in the expression "2-(carboxyacylaminobenzenesulfonamido)-4-thiazolones" covers the divalent residue —$C_6H_4$—, to one free valence of which the carboxyacylamino group is linked and to the other free valence of which the sulfur of the sulfonyl group is attached, so that there are only those two substituents on the benzene ring. On the other hand, the term "phenyl" as used in this specification and claims, for example, in "2-(carboxyacylaminophenylsulfonamido)-4-thiazolones" is generic and includes this divalent residue —$C_6H_4$— as just hereinabove defined with respect to the term benzene (otherwise referred to as the non-substituted-phenyl divalant group), as well as to the substituted phenyl nucleus in which one or more of the remaining four hydrogen atoms may be replaced by an additional substituent on the ring.

The expression "carboxylates" employed in any of the claims embraces those groups resulting from replacing the hydrogen of a carboxyl group with any other grouping capable of combining with a carboxyl radical to form a carboxylate such as the various metals and the like, or an alkyl radical or a nitrogen base and the like of the type hereinabove described at page 1, column 1, lines 25 through 33, and prepared in the manner hereinabove described beginning at page 3, column 1, line 49, and running through line 73.

This application is a division of my copending application, Serial No. 405,936, filed August 8, 1941.

I claim:

1. 2 - carboxyacylaminoarylsulfonamido-4-thiazolones, in which the carboxyacyl group is unsaturated aliphatic.

2. At least one 2-(carboxyacylaminophenylsulfonamido)-4-thiazoline, prepared for use as a therapeutic, of the group consisting of those of the formula

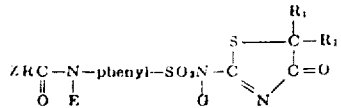

and the carboxylates thereof, in which ZR is a carboxyl containing group linked to the C=O by a carbon atom of the radical R; R is the residue of an unsaturated aliphatic polycarboxylic acid stripped of its carboxyl groups; E and G are each separately and independently a member of the class consisting of hydrogen, alkyl, aralkyl and aryl radicals; and the thiazolone ring together with the elements $R_1$ and $R_2$ attached to the 5-carbon on the ring represents a member of the class consisting of the thiazolone and nuclearly substituted thiazolone radicals.

3. 2 - (N⁴ - carboxyacylaminophenylsulfonamido)-4-thiazolones, in which the carboxyacyl group is unsaturated aliphatic.

4. 2 - (N⁴ - maleylaminophenylsulfonamido)-4-thiazolones.

5. 2 - (carboxyacylaminobenzenesulfonamido)-4-thiazolones, in which the carboxyacyl group is unsaturated aliphatic.

6. 2 - (N⁴-carboxyacylaminobenzenesulfonamido)-4-thiazolones, in which the carboxyacyl group is unsaturated aliphatic.

7. At least one compound of the group consisting of 2-(N⁴-maleylaminophenylsulfonamido)-4-thiazolones and the carboxylates thereof.

8. 2-N⁴-maleylsulfanilamido-4-thiazolones.

9. 2-N⁴-maleylsulfanilamido-5-ethyl-4-thiazolone.

10. 2-N⁴-aconitylsulfanilamido - 5,5 - diethyl-4-thiazolone.

11. 2 - N⁴ - carboxyacylaminoarylsulfonamido-5,5-dialkyl-4-thiazolones, in which the carboxyacyl group is unsaturated aliphatic.

MAURICE L. MOORE.

---

CERTIFICATE OF CORRECTION.

Patent No. 2,366,641.  January 2, 1945.

MAURICE L. MOORE.

It is hereby certified that error appears in the printed specification of the above numbered patent requiring correction as follows: Page 1, second column, line 49, for "hydroxy" read --hydroxyl--; page 2, first column, line 56, for "transform" read --trans-form--; and second column, line 52, for "thiazole" read --thiazolone--; page 3, second column, line 75, claim 2, for "thiazoline" read --thiazolone--; and that the said Letters Patent should be read with this correction therein that the same may conform to the record of the case in the Patent Office.

Signed and sealed this 7th day of August, A. D. 1945.

Leslie Frazer
Acting Commissioner of Patents.

(Seal)

therapeutic, of the group consisting of those of the formula

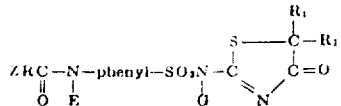

and the carboxylates thereof, in which ZR is a carboxyl containing group linked to the C=O by a carbon atom of the radical R; R is the residue of an unsaturated aliphatic polycarboxylic acid stripped of its carboxyl groups; E and G are each separately and independently a member of the class consisting of hydrogen, alkyl, aralkyl and aryl radicals; and the thiazolone ring together with the elements $R_1$ and $R_2$ attached to the 5-carbon on the ring represents a member of the class consisting of the thiazolone and nuclearly substituted thiazolone radicals.

3. 2 - ($N^4$ - carboxyacylaminophenylsulfonamido)-4-thiazolones, in which the carboxyacyl group is unsaturated aliphatic.

4. 2 - ($N^4$ - maleylaminophenylsulfonamido)-4-thiazolones.

5. 2 - (carboxyacylaminobenzenesulfonamido)-4-thiazolones, in which the carboxyacyl group is unsaturated aliphatic.

6. 2 - ($N^4$-carboxyacylaminobenzenesulfonamido)-4-thiazolones, in which the carboxyacyl group is unsaturated aliphatic.

7. At least one compound of the group consisting of 2-($N^4$-maleylaminophenylsulfonamido)-4-thiazolones and the carboxylates thereof.

8. 2-$N^4$-maleylsulfanilamido-4-thiazolones.

9. 2-$N^4$-maleylsulfanilamido-5-ethyl-4-thiazolone.

10. 2-$N^4$-aconitylsulfanilamido - 5,5 - diethyl-4-thiazolone.

11. 2 - $N^4$ - carboxyacylaminoarylsulfonamido-5,5-dialkyl-4-thiazolones, in which the carboxyacyl group is unsaturated aliphatic.

MAURICE L. MOORE.

---

CERTIFICATE OF CORRECTION.

Patent No. 2,366,641.　　　　　　　　　　January 2, 1945.

MAURICE L. MOORE.

It is hereby certified that error appears in the printed specification of the above numbered patent requiring correction as follows: Page 1, second column, line 49, for "hydroxy" read --hydroxyl--; page 2, first column, line 56, for "transform" read --trans-form--; and second column, line 52, for "thiazole" read --thiazolone--; page 3, second column, line 75, claim 2, for "thiazoline" read --thiazolone--; and that the said Letters Patent should be read with this correction therein that the same may conform to the record of the case in the Patent Office.

Signed and sealed this 7th day of August, A. D. 1945.

Leslie Frazer
Acting Commissioner of Patents.

(Seal)